United States Patent [19]

Harmon

[11] Patent Number: 4,768,815
[45] Date of Patent: Sep. 6, 1988

[54] SUPPLEMENTAL LOCKING MECHANISM FOR A TENSION LATCH ASSEMBLY

[75] Inventor: Raymond E. Harmon, Orange, Calif.

[73] Assignee: Rexnord Inc., Brookfield, Wis.

[21] Appl. No.: 136,460

[22] Filed: Dec. 21, 1987

Related U.S. Application Data

[63] Continuation of Ser. No. 854,977, Apr. 23, 1986, abandoned.

[51] Int. Cl.⁴ .............................................. E05C 5/02
[52] U.S. Cl. ..................................................... 292/113
[58] Field of Search ............... 292/108, 113, 210, 297, 292/DIG. 27, DIG. 31, DIG. 99, DIG. 62

[56] References Cited

U.S. PATENT DOCUMENTS

| | | | |
|---|---|---|---|
| 2,894,777 | 7/1959 | Hogan | 292/113 |
| 4,053,177 | 10/1977 | Stammreich et al. | 292/113 |
| 4,244,611 | 1/1981 | Wahoski | 292/113 |
| 4,318,557 | 3/1982 | Bourne et al. | 292/113 |

FOREIGN PATENT DOCUMENTS 1429592  3/1976  United Kingdom.
2152127A 7/1985  United Kingdom.
2170548A 8/1986  United Kingdom.

OTHER PUBLICATIONS

European Search Report (one page) dated Apr. 27, 1987 for EP Application No. 8707345 in the name of Rexnord Inc.

Primary Examiner—Richard E. Moore

[57] ABSTRACT

A supplemental locking mechanism is provided for an overcenter tension latch assembly. The mechanism prevents the keeper engaging member or latch hook (50) from moving out of its toggle position whether or not under load with the keeper of the latch assembly. The mechanism may be a rigid impeding element (90) which is spring biased for direct actuation by the operator through the handle of the latch assembly. The impeding element (90) is arranged in the latch assembly such that it will bear upon a portion of the latch hook (50) at a position which will counteract forces applied to the assembly which forces would otherwise cause the latch assembly to move out-of-toggle.

4 Claims, 7 Drawing Sheets

SUPPLEMENTAL LOCKING MECHANISM FOR A TENSION LATCH ASSEMBLY

This application is a continuation of application Ser. No. 854,977, filed Apr. 23, 1986, now abandoned.

TECHNICAL FIELD

The present invention relates to latch mechanisms used in the aircraft and aerospace industries, and in particular to locking mechanisms for overcenter tension latch assemblies.

BACKGROUND

The present invention is an improvement in locking mechanisms for latches which use the overcenter concept, i.e. latches which employ a pivot point which must be "overcenter" for the latch to remain securely locked. Such latches have typically been able to provide only limited secondary locking features for insuring that the primary or overcenter locking mechanisms remain securely locked and function properly when the latch is in use. For example, the use of a locking trigger release element is well known in the latch industry as a secondary locking feature. However, the development of new aircraft and space vehicles demands latching reliability even in the event of failure of the secondary locking feature. Hence the development of the present invention.

SUMMARY OF THE INVENTION

The present invention is an improvement in locking mechanisms for overcenter tension latch assemblies. The locking mechanism of the present invention provides a supplemental locking feature.

In the particular application envisioned for the invention at the present time, the tension latch assembly includes a handle, a latch hook, a keeper for the latch hook, a fixed pivot point, a second pivot point rotatable about the fixed pivot point, and a link mechanism which engages the handle and connects the latch hook with the fixed pivot point. The link mechanism permits rotational movement of the second pivot point about the fixed pivot point. The second pivot point is located so as to be overcenter relative to the fixed pivot point when the latch hook is secured and under load relative to the keeper, and to thus provide a primary locking mechanism for the assembly.

The present invention provides an additional or supplemental locking mechanism for the latch assembly by providing a mechanism for preventing rotation of the assembly out of its toggle position whether or not the latch hook is under load with the keeper. The present invention is able to maintain the latch hook in its primary lock position even though forces applied to the secured latch assembly are of the type which would otherwise release the assembly from its overcenter primary locked positioning. One way to accomplish the present invention is to provide an impeding element which is constructed and arranged relative to the latch hook, the link, and the pivot points so as to counteract any such forces which would otherwise release the primary locking mechanism or allow the assembly to move out-of-toggle.

The foregoing is but a brief summary of the invention. In the description which follows a preferred embodiment of the invention will be described in detail. From the description, it will become clear that the present invention is a significant improvement over what is currently known in the prior art for locking latch assemblies. The invention impedes the hook member from movement as a result of vibrational or other undesirable forces acting on the assembly. The invention provides a supplemental locking mechanism which will assist in maintaining the reliability of the primary locking mechanism even in the event of a failure of a secondary locking mechanism such as a trigger device. This supplemental locking feature is not provided by any known over-the-center prior art latches. These and other features of the invention and resulting advantages over the prior art will be explored in greater detail hereinafter.

DETAILED DESCRIPTION OF A PREFERRED EMBODIMENT

With reference now to the drawings, a preferred embodiment for practicing the present invention will be described. The same reference numerals are used throughout the drawings to indicate the same elements.

Turning to FIGS. 1-4 a preferred embodiment of the invention will be described along with the parts of a tension latch assembly. A handle 20, a keeper engaging member (or latch hook as it will hereinafter be referred to) 50, and means for linking the handle 20 with the latch hook 50 form the basic components of the tension latch assembly shown. For a point of reference only, words such as forward, rearward, upper and lower are used to assist the reader in orienting the various components with respect to each other. Such references as herein used may not necessarily apply in all applications of the invention, e.g. when an embodiment is mounted so that the handle opens in a direction one-hundred and eighty degrees from the orientation shown in the drawings. Persons skilled in the art will appreciate the likelihood of such varied mountings and thus any further explanation is not believed to be necessary.

Figures 1, 1A, 1B, 1C, 1D:
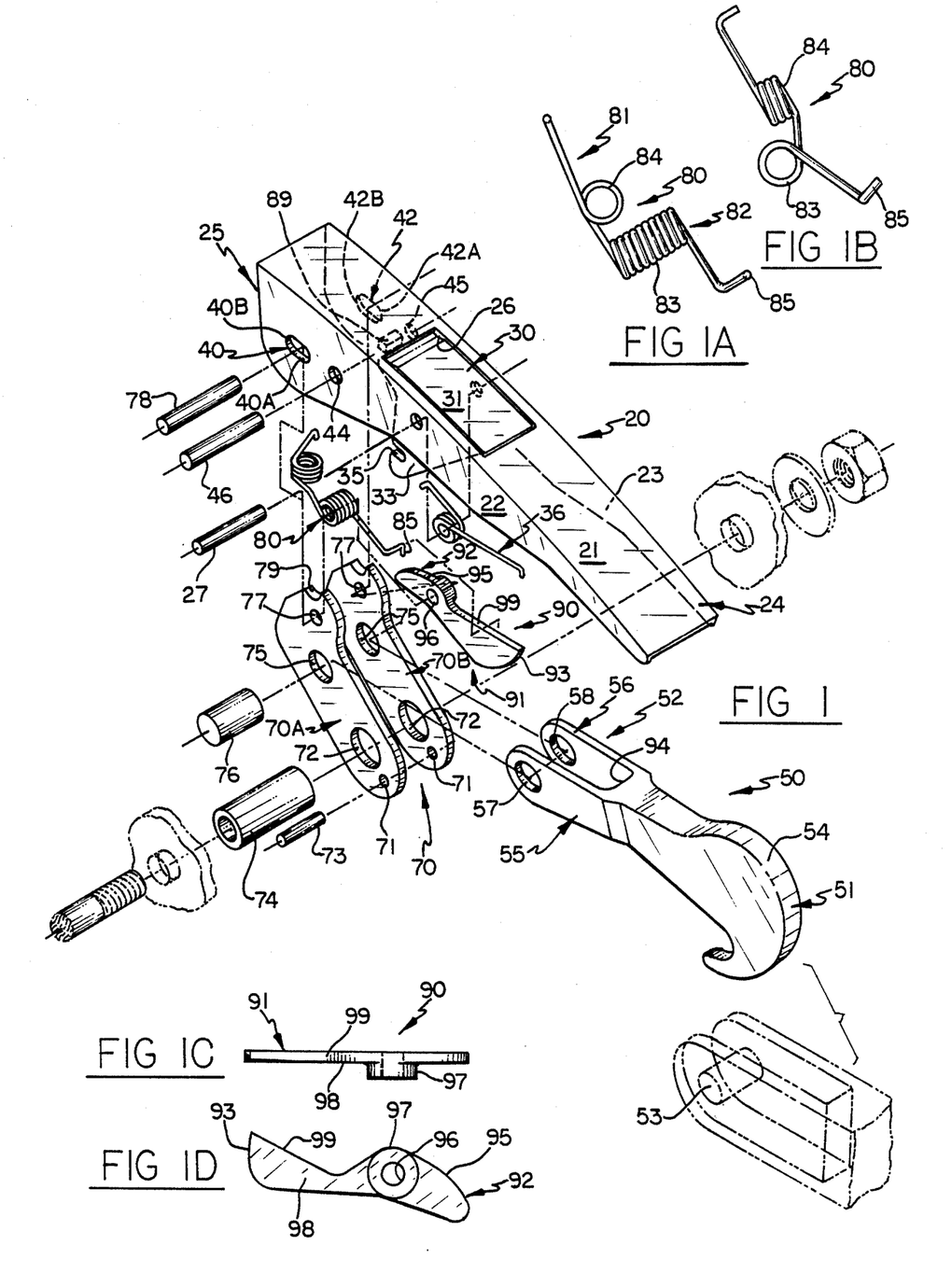
FIG. 1 is an exploded view in perspective of a tension latch assembly in which a preferred embodiment of the present invention is shown.
FIG. 1A is an enlarged top plan view of a spring used with the preferred embodiment of the present invention.
FIG. 1B is an enlarged side elevational view of the spring shown in FIGS. 1 and 1A.
FIG. 1C is a top plan view of a preferred embodiment of the present invention.
FIG. 1D is a side elevational view of what is shown in FIGS. 1 and 1C.
Figure 2:
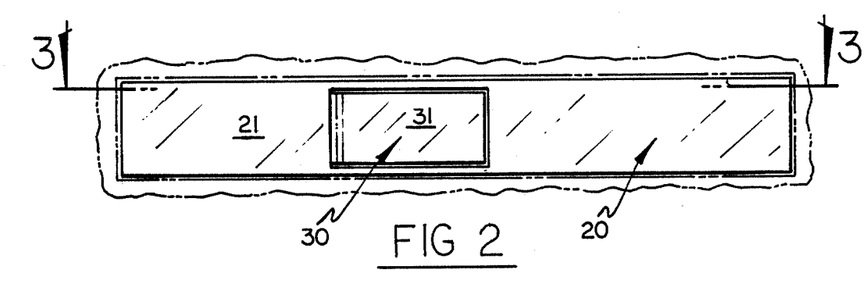
FIG. 2 is a plan view of the tension latch assembly shown in FIG. 1 in assembled and closed condition.

The handle 20 in the illustrated embodiments has a typical channel-shape construction in that it has a central top or base portion 21 from which extend, opposite each other from either lengthwise edge of the base portion 21, a pair of identical side walls 22, 23. Accordingly the handle has what may be referred to as a forward, first end 24, and a rearward second end 25. A generally centrally located area of the base portion 21 is formed with an opening 26 therein. Mounted in the opening 26 by means of a rivet 27 or like element is a trigger mechanism 30. The particular trigger mechanism 30 shown in the drawings is known in the art in that its uppermost wall 31 lies in flush relationship with the handle base portion 21 when the trigger is in a locked position. Extending from the trigger top wall 31 and substantially parallel to the handle sidewalls 22, 23 are a pair of arms 32, 33. Each arm 32, 33 has at its lowermost portion an indented or notched area forming a hook 34, 35 for capturing therein a portion of an underlying link mechanism to be described further below. A conventional spring 36 is secured with the rivet 27 in a manner such that the trigger mechanism 30 may be pivoted about the rivet 27 when a portion of the trigger wall 31 is depressed.

At the rearward end 25 of the handle 20 a pair of slots 40, 42 are provided, one each in a respective side wall 22, 23. The slots 40, 42 are aligned with respect to each other and have a pre-determined position and size relative to a portion of the link mechanism with which it must cooperate. Each slot 40, 42 has a forward end 40A, 42A respectively and a rearward end 40B, 42B respectively. Forward of each slot 40, 42, is an aperture or through-hole 44, 45 through which a rivet 46 or like element passes and is secured between the two apertures 44, 45.

The latch hook 50 has a forward, first end 51 and a rearward, second end 52. The first end 51 has a downwardly extending portion formed so as to engage and capture a keeper 53 (shown in phantom in FIG. 1). This end 51 of the latch hook 50 is shown constructed so that when engaged with a keeper 53, there will be substantially little room if any between the top edge 54 of the latch hook 50 and the immediately adjacent handle top portion 21. The rearward or second end 52 of the latch hook 50 is formed as a pair of rearwardly extending arms 55, 56. Each arm has a rearwardmost through-hole 57, 58 respectively.

The third basic component of the latch assembly is the means for linking the handle 20 to the latch hook 50. A link mechanism 70 in the preferred embodiment comprises a pair of individual links 70A, 70B of identical construction. Each link has a forward, first end and a rearward, second end. In the forward end of each link is an aperture 71. These forwardmost apertures 71 receive a rivet or pin 73. The pin 73 is secured therein so as to extend between the apertures 71 and protrude beyond each link a sufficient distance which will allow the hook portions 34, 35 of the trigger mechanism 30 to be captured by the protruding portions of the pin 73. A second aperture 72 to the rear of the forward aperture 71 on each link 70A, 70B is constructed so as to receive a bushing 74 for mounting the latch hook assembly to a part of the aircraft's structure which is shown in phantom. The bushing 74 serves as a fixed pivot point in the assembly. At the rearward, second end of each link 70A, 70B are two additional pairs of apertures. The forwardmost apertures 75 at the link second end are sized to receive a pivot pin 76 therebetween. The pivot pin 76 pivotally mounts the second end of the latch hook 50 to the second end of the link mechanism 70 by an alignment of apertures 57, 58, 75. The pin 76 is inserted therethrough and securely retained therein for rotatable movement about the fixed pivot point or bushing 74. The second pair of apertures 77 at the link mechanism second end are formed in each link 70A, 70B at a position which permits an alignment of the apertures 77 with a respective slot 40, 42 at the handle second end 25. A pivot pin 78 is thus inserted through the aligned apertures 77 and slots 40, 42 to pivotally mount the handle to the link mechanism. The pin 78 may travel in the slot 40, 42 between the slots' two ends. Finally at the upper edge of each link rearward end, adjacent the apertures 77, a detent or camming type surface 79 is formed so as to receive and capture a portion of the pin 78 therein when the handle is indexed into a second position. This feature will be explained further in the operation of the preferred embodiment which follows.

A spring 80 is provided in order to bias the handle 20 open when the handle 20 is released by the trigger 30 from locking engagement with the link mechanism 70. The particular spring 80 shown has a unique configuration which may be best appreciated by a study of FIGS. 1A and 1B in conjunction with FIG. 1. The spring 80 has a first coiled end 81 which bears upon a portion of the underside of the handle second end 25 and a bearing block 89 attached thereto. Integrally formed with the first end 81 is a second end 82 whose coiled section 83 is oriented perpendicular with respect to the coiled section 84 of the first end 81. When the latch hook assembly is installed the coiled section 83 of the spring second end 82 surrounds and is secured by the pin 78. The free end 85 of the second coil end 82 is formed in an L shape configuration for capture upon and engagement with a portion of the invention preferred embodiment to be explained next.

A preferred embodiment for the present invention may be appreciated from a study of FIGS. 1, 1C, and 1D. A mechanism is provided which will prevent rotation of the link mechanism 70, the latch hook 50 and the pivot pin 76 about the fixed pivot pin 74 when the handle is closed or down or when the latch hook 50 is secured, under load, with the keeper 53. In the preferred embodiment the mechanism is a rigid impeding element 90 which is positioned intermediate the latch hook 50 and the handle 20. The impeding element 90 has a first or forward portion 91 and a second or rearward portion 92 formed integral to the first portion. The forward portion 91 includes a leading or forwardmost end edge 93 which may have an arcuate shape as shown. It should be noted that the latch hook 50 rearwardly extending arms 55, 56 are connected by a wall surface 94. The impeding element forward portion 91 is of a size so as to fit, without interference, between the latch hook arms 55, 56 with the leading edge 93 bearing upon the wall surface 94 as will be described further hereinafter.

Figures 3, 3A, 3B:
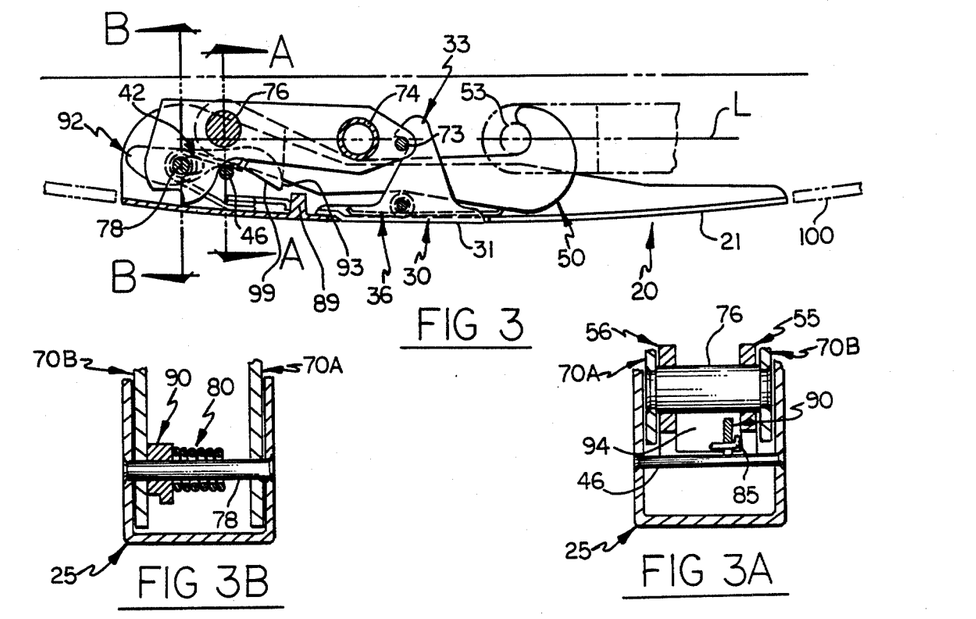
FIG. 3 is a view in cross-section of the tension latch assembly as seen generally along lines 3—3 in FIG. 2.
FIG. 3A is a view in cross-section of the tension latch assembly as seen generally along lines A—A in FIG. 3.
FIG. 3B is a view in cross-section of the tension latch assembly as seen generally along lines B—B in FIG. 3.

The rearward portion 92 of the impeding element 90 includes a trailing edge 95 which is provided with a curved surface also. An area of the second portion 92 is provided with a through-hole 96 at a point distal from the leading edge 93 of the impeding element. The through-hole 96 is of a size so as to accommodate the passage and contain therein the pivot pin 78. In the preferred embodiment a bushing-type extension 97 is provided on one-side 98 of the impeding element and surrounds the through-hole 96. This extension 97 is provided for stabilizing the location of the impeding element on the pivot pin 78. The continuous but different shaped surfaces of the impeding element are provided to insure clearance with respect to the other operating structure surrounding the impeding element when assembled as shown in FIG. 3.

As can now be appreciated the free end 85 of the spring 80 fits over the top edge 99 of the impeding element 90 and grasps the element along the side wall 98. Thus the impeding element 96 is biased by the spring 80 such that the movement of the impeding element 90 is directly affected by movement of the handle 20 which is also biased by the spring 80. It should be noted that other embodiments for the invention may require the use of a spring separate from that which is used to bias the handle as does the spring 80 in the preferred embodiment.

OPERATION OF THE PREFERRED EMBODIMENT

Referring now to FIGS. 2-14, the preferred embodiment in its assembled, operable form may be appreciated. In FIGS. 2-14 the tension latch assembly is shown as it would appear in cross-section at various degrees of release and locking.

In FIG. 3 the latch hook 50 is shown in full load engagement with the keeper 53 of the keeper assembly. The handle is shown in its closed position and is locked to the link mechanism pin 73 by the trigger 30. Both the trigger wall 31 and the handle top portion 21 lie flush with the surface 100 (shown in phantom) of the aircraft structure in which the invention is mounted. In FIG. 3 it can also be seen that the primary load line L of the assembly is defined by a plane which passes through the center of the keeper 53 and the center of the mounting bushing 74. The pivot pin 76 by which the latch hook 50 is primarily secured to the link mechanism 70 lies in an area above, or overcenter with respect to the load line. Any additional tension load applied along the latch load line will tend to close the latch, accordingly the latch is termed overcenter. Notice also in FIG. 3 that the leading edge 93 of the impeding element bears on the surface 94 of the latch hook 50.

Figure 4:
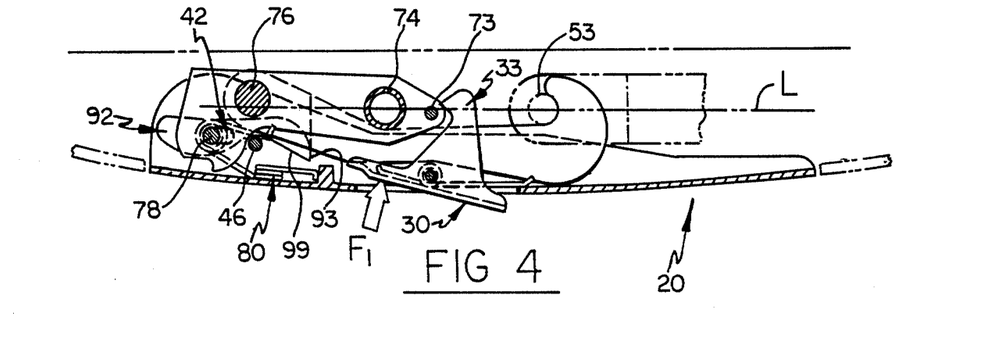
FIG. 4 is a view of what is shown in FIG. 3 as an opening force is exerted on the closed tension latch assembly.

To open the handle 20, without releasing the hook member 50, a force $F_1$, is exerted on the trigger 30 as shown in FIG. 4. A force sufficient to depress and thus overcome the biasing spring 36 is required to pivot the trigger hook portion 35 away from the pin 73 and thus release the handle so that it may freely rotate open either manually or by the biasing force of the spring 80.

Figures 5, 6:
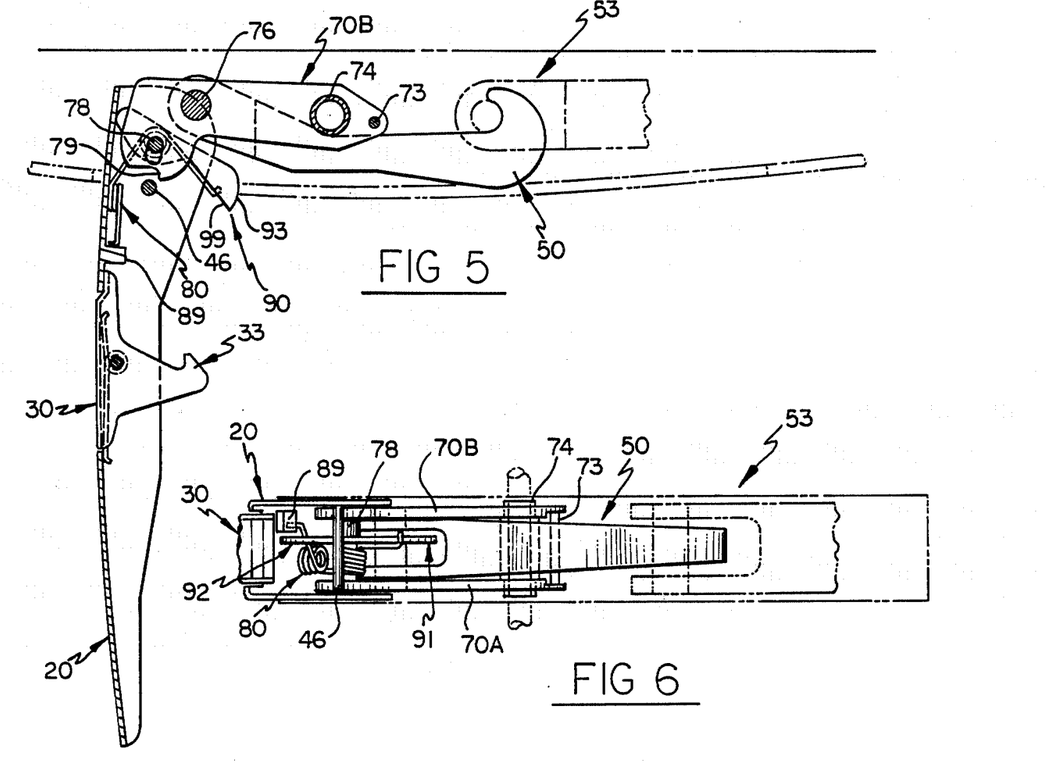
FIG. 5 is a view of what is shown in FIGS. 3 and 4 when the handle of the latch assembly is in the open position.
FIG. 6 is a bottom plan view of what is shown in FIG. 5.
Figure 7:
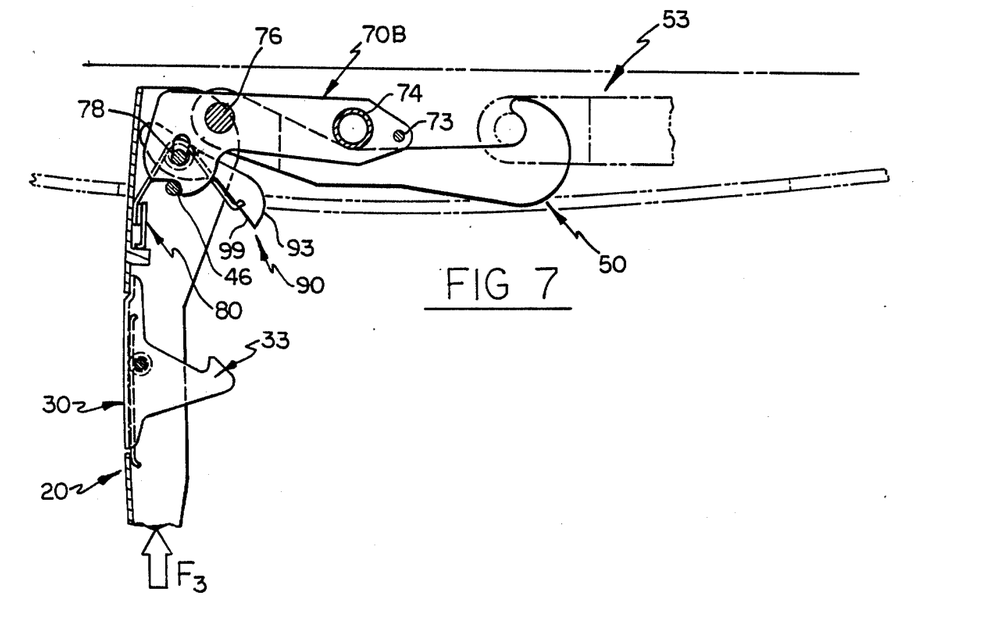
FIG. 7 is a cross-sectional view of the latch assembly shown under forces which cause the handle and link mechanism to engage for simultaneous movement for release of the latch hook from the keeper assembly.

After the handle has rotated to a first or open position the latch hook assembly will still be under load with the keeper assembly as shown in FIGS. 5 and 7. It should be noted that at this point the impeding element 90 is no longer contacting the latch hook 50, but instead has moved rearwardly with the handle 20. The handle opens approximately ninety degrees, unlike handles of prior art latches which generally open no more than fifteen degrees. At this time the assembly may be inspected, adjusted or otherwise attended to without requiring release of the hook member from the keeper 53. In FIG. 5 it can be seen that the pin 78 is positioned in the rearward end 40B, 42B of the slots 40, 42 when the handle is in this first position.

To release the latch hook 50 from the keeper assembly 53, the operator must index the handle into a second position from that which is shown in FIG. 5, in order to cause the link 70, and hence the latch hook 50, to move forward when the handle 20 is rotated. To index the handle into the second position the operator exerts a force, $F_3$, on the handle 20 in a direction towards the link mechanism second end 25. The force $F_3$ must be sufficient to overcome the biasing force of the spring 80 and move the handle such that the pin 78 is displaced with respect to the slots, i.e. from its initial position into a second position at the forward ends 40A, 42A of the slots 40, 42. When this occurs, the pin 46 moves downwardly and is positioned for capture by the detents 79 on the links 70A, 70B. See FIG. 7.

Figure 8:
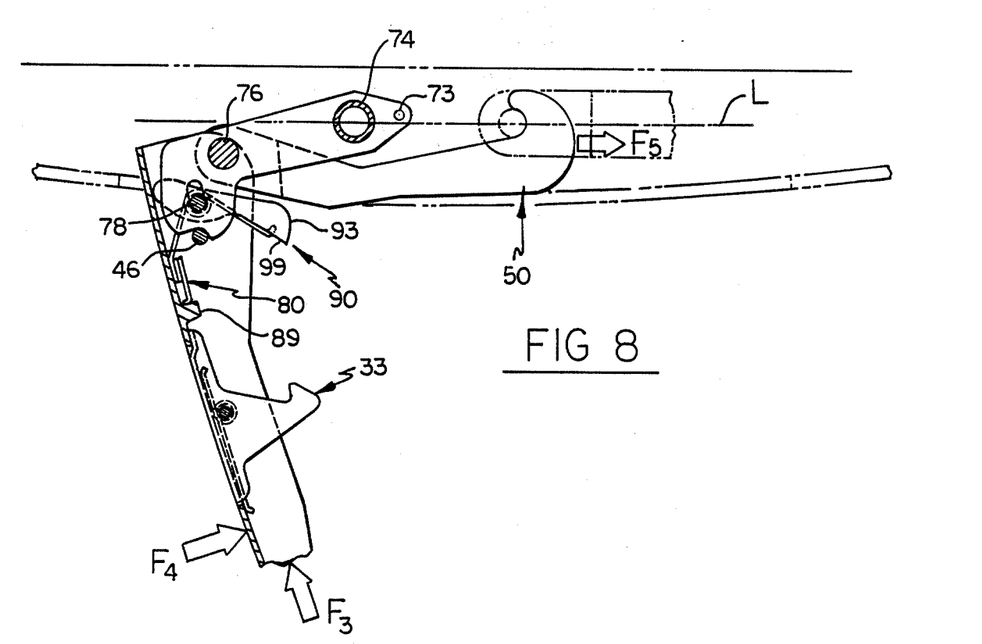
FIG. 8 is a view of what is shown in FIG. 7 as the handle and link mechanism are moved to release the latch hook.

After the indexing has been accomplished and while the handle is being maintained in its second position by a force $F_3$ the handle is rotated as indicated by the arrow $F_4$ shown in FIG. 8. Because the pin 46 is captured by the detents 79 and the pin 78 is positioned in the forward ends of the slots 40, 42, the handle 20 is mechanically linked with the link mechanism 70. Thus any forwardly directed force exerted upon the handle 20 will be transferred through the link mechanism 70 and hence to the latch hook 50. The pivot pin 76 is thus brought over the center or load-line L. The hook member 50, as it moves forward as indicated by the arrow $F_5$ in FIG. 8, is released from the keeper assembly and is unlatched allowing the operator to access the interior of the aircraft structure. Note again the position of the impeding element 90 as it remains clear of the latch hook 50 to permit free movement of the latch hook as it is being deliberately unlatched.

Figure 9:
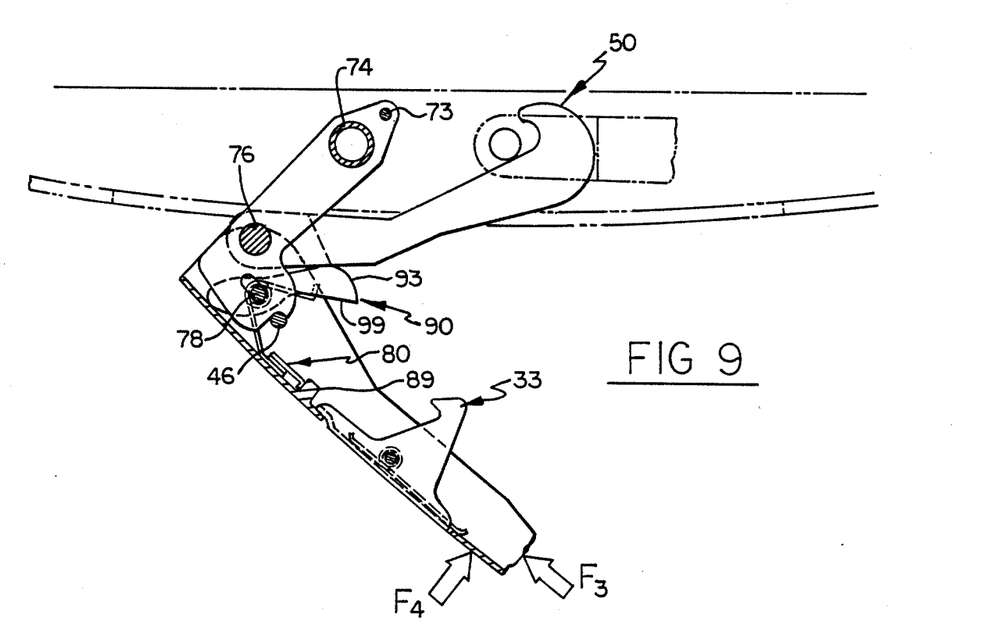
FIG. 9 illustrates the positional relationship of the present invention and the latch hook as the tension latch assembly is unlatched or released from the keeper.

However, FIG. 9 illustrates that immediately after the load on the latch hook 50 has been released, the handle, as it continues to move forward under the forces $F_3$ and $F_4$, brings the impeding element surface 93 adjacent the latch 50 into contact with the latch hook. The impeding element, in this particular application will thus exert a lifting force upon the released latch hook 50 as the handle is continued in its rotation about the pivot pins 74, 76 by the operator. This arrangement thus assists the operator with removal of the latch hook end portion 51 from capture by the keeper pin 53. In the absence of the spring 80 biasing the impeding element 90, such assistance would not be available to the operator, and the operator would then have to manually lift the latch hook 50 out and away from the keeper pin 53.

Figure 10:
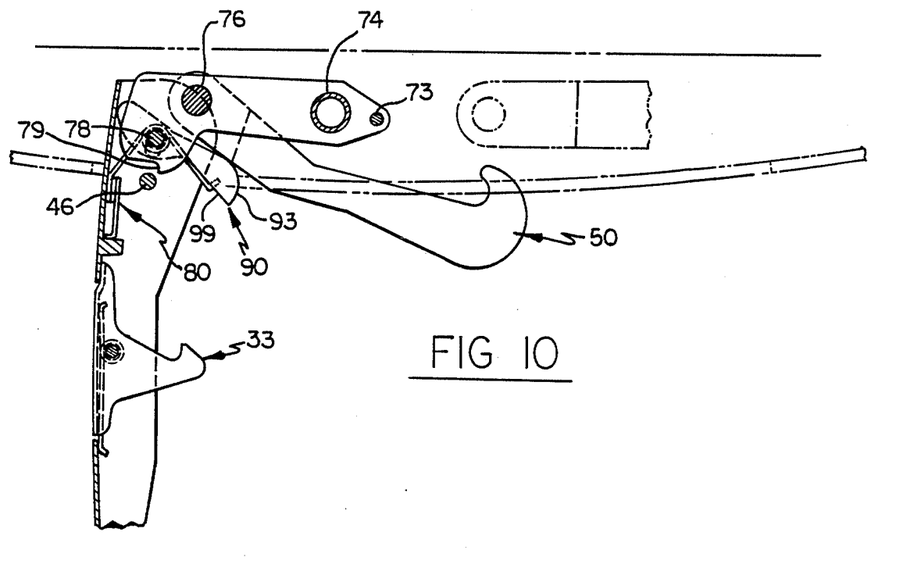
FIG. 10 is a view of what is shown in FIGS. 5-9 of the tension latch assembly in its open and released positions.

When the latch hook 50 is released from the keeper assembly, the handle rotation may be reversed once again. In its unlatched position, the hook member 50 rests on the impeding element 90, clear of the keeper portion, as shown in FIG. 10. The spring 80 returns the handle to its first position with the pin 46 free from capture by the link detents 79. The pin 78 is returned to a position at the rearward ends of the slots 40, 42 once again.

Figure 11:
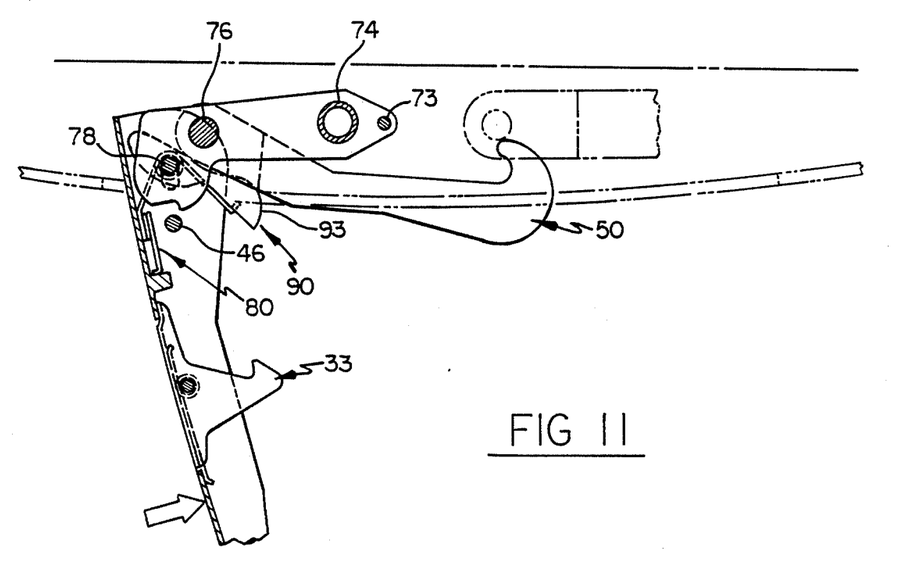
FIG. 11 is a view of the tension latch assembly as the latch hook is moved into position for re-securement with the keeper assembly.
Figure 12:
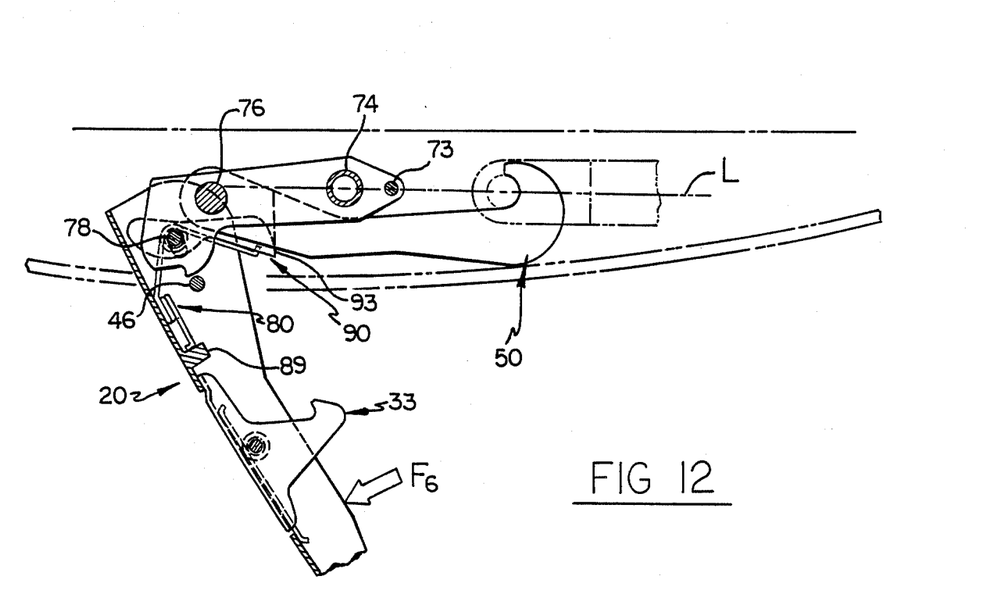
FIG. 12 is a view of the preferred embodiment subsequent to the movement illustrated in FIG. 11.

To re-latch the hook assembly with the keeper assembly the operator need merely rotate the handle forward as shown in FIG. 11. The pivot connections made possible via pins 78 and 76 as well as the impeding element 90 bearing upon the latch hook, are sufficient to bring the latch hook 50 forward with the handle 20. Indexing of the handle, as was required for the release of the latch hook 50, is not necessary for the re-latching of the assembly. When the latch hook 50 is again positioned forward of the keeper 53 as shown in FIG. 12, the handle is then rotated in a rearward direction by a force $F_6$ causing the hook member to engage the keeper. The pivot 76 is moved rearwardly and upward by the handle movement until it passes over the center or load line L. See FIG. 13. When this occurs the latch assembly is again secured by its primary toggle locking mechanism as shown in FIG. 3. The handle may then be pushed forward, thereby automatically positioning the impeding element with respect to the latch hook. The handle and latch hook are thus locked by the secondary locking mechanism, i.e. trigger 30, and the link mechanism pin 73.

From the foregoing description of the construction and operation of a preferred embodiment, the benefits and advantages of the present invention may now be understood. One significant advantage is that the inadvertent release of a latched hook member under vibration may now be prevented even in the event of a failure of the secondary locking mechanism, e.g. a locking trigger as shown in this application. Essentially the impeding element of the invention, as constructed and positioned relative to the other parts of the latch assembly, bears upon the secured latch hook and impedes or obstructs the latch hook from inadvertent reverse movement which, in the absence of the invention, may cause the latch hook to move out of its overcenter securement with respect to the load line. For example, in the event the trigger lock should fail or otherwise be released in mid-flight of the aircraft, the handle would open and be subject to whatever airstream or vibrational forces are present in the environment. With prior art latch designs, such a failure of the secondary locking mechanism in most circumstances will also lead to the failure of the primary locking mechanism when the released handle is subject to uncontrolled wind or vibrational forces.

Another feature of the invention is the ease by which it may be used. The impeding element is controlled by the operator through normal handle rotation. No additional manual movement of the assembly is required by the operator with respect to the spring-biased impeding element.

Figure 14:
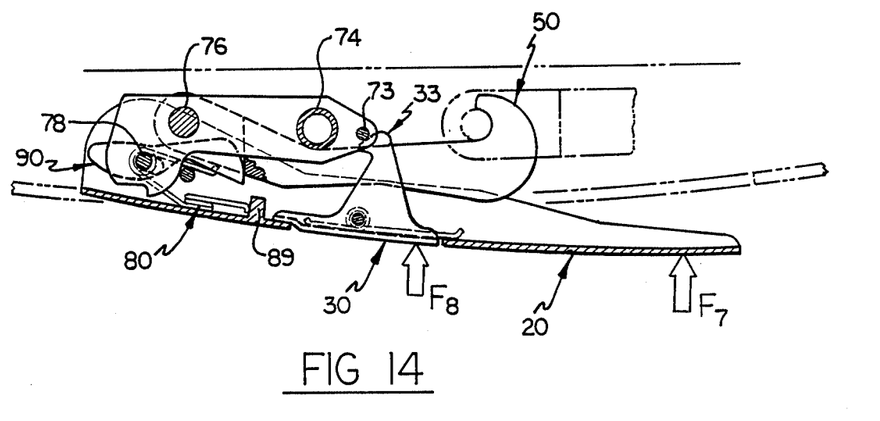
FIG. 14 is a view illustrating the relative positions of the preferred embodiment of the present invention and a secondary locking mechanism, i.e. a trigger, as the latch assembly handle is secured to the latch hook.

Still another important feature of the invention is the added safety it provides an operator when the operator is improperly closing a latch assembly which is under load, e.g. when the operator is blocking the free movement of the trigger while simultaneously pressing upon the handle to close it. FIG. 14 illustrates this situation.

Figure 13:
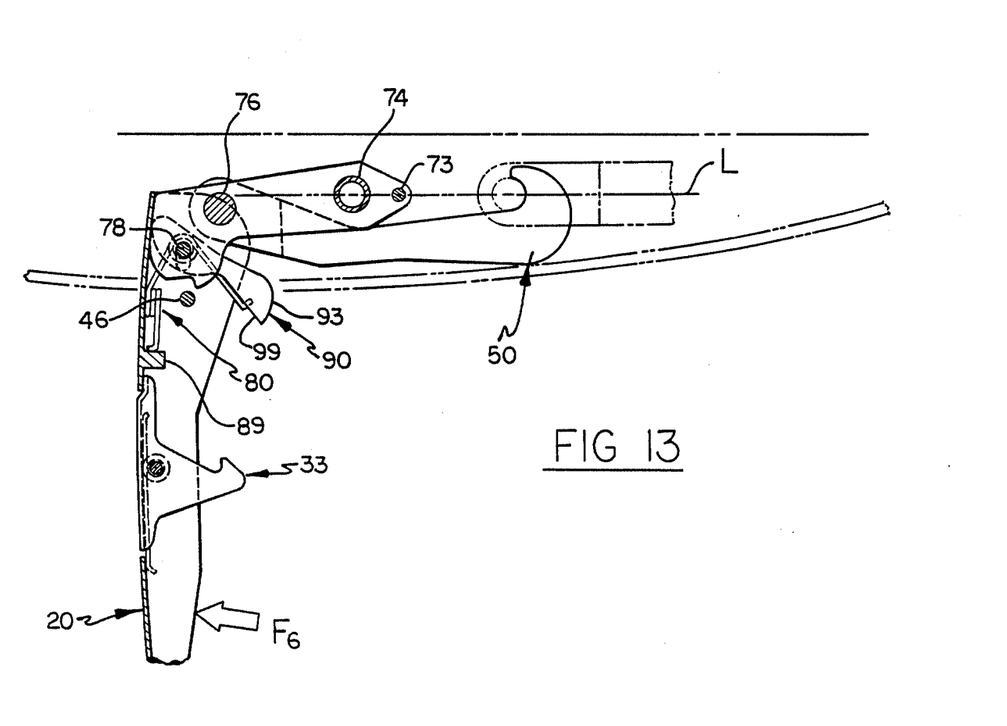
FIG. 13 is a view of the tension latch assembly as a force is applied to bring the assembly overcenter with respect to the fixed pivot point.

With reference to FIG. 14, when re-latching the latch assembly subsequent to the step shown in FIG. 13, the operator may exert a closing force not only upon the handle as noted by $F_7$ but also upon the forward end of the trigger 30 as noted by $F_8$. If the force $F_8$ is allowed to remain, the trigger 30 will not function properly in that the force $F_8$ prevents the trigger 30 from rotating so that the hook portion 33 is captured by the pin 73. Hence, the secondary lock does not lock. Instead, the closing force $F_8$ as transferred to the trigger hook portion 32 bearing upon the pin 73 may be sufficient to cause the link mechanism 70 to be leveraged downwardly and pivot about the pin 73. Such may cause the assembly to be moved out of its primary, locked overcenter position. However, with the use of the present invention such a malfunctioning is prevented in that FIG. 14 illustrates that the impeding element surface 93 is continuously bearing against the latch hook 50 as the closing forces $F_7$, $F_8$ are being exerted upon the handle. Accordingly, the impeding element will exert a force against the latch hook 50 which will counteract any rotational force upon the link mechanism which is caused by the improper functioning of the trigger lock 30. Thus, the impeding element impedes or prevents the link mechanism, latch hook and hence the second pivot point or pivot pin 76 from rotating about the fixed pivot point or pivot pin 74.

Finally, the present invention provides the industry with a flexibility in its designing of such tension latch assemblies which has heretofore not been available. Because the impeding element functions as it does as a supplemental locking mechanism, various other design restrictions which have been required to offset latch malfunctioning can optionally be eliminated. This will then free the designers of such latch mechanisms from burdensome design restrictions and provide the customer with latch designs which are more specifically suited for the customers particular application. One such design restriction which may be eliminated when the present invention is used is that which calls for the top surface 54 of the latch hook 50 to be in as near close abutment with the adjacent underside of the latch handle 20 as possible. This design restriction is often required in prior art latch designs in order to prevent the latch from inadvertently going out-of-toggle as a result of severe vibrational forces acting upon the assembly when under load. Accordingly the present invention frees the design of both the hook and the handle from one more restriction.

The present invention affords a number of advantages in one unique design which are not provided by any prior known latch locking mechanisms. To persons skilled in the art modifications of certain elements of the preferred embodiment may be possible without departing from the spirit of the invention. Accordingly the invention is believed limited only by the scope of the claims which follow.

What is claimed is:

1. In an overcenter tension latch assembly having a handle, a latch hook, a keeper for the latch hook, and a link mechanism having a fixed pivot point and a second pivot point rotatable about the fixed pivot point, the link mechanism engaging the handle and connecting the latch hook with the fixed pivot point, the second pivot point being overcenter relative to the fixed point to provide a primary locking mechanism when the latch hook is secured relative to the keeper, wherein the improvement comprises:

means, independent of the handle, for preventing rotation of the link mechanism, the hook, and the second pivot point about the fixed pivot point when the latch hook is secured in latching relationship to the keeper and the handle is free to rotate relative to the secured hook, said means preventing rotation when forces are applied to the secured latch assembly tending to release the assembly from an overcenter primary locked position, said rotation preventing means being constructed and arranged to counteract such forces and thereby provide a supplemental locking mechanism.

2. In the overcenter tension latch assembly of claim 1, wherein said rotation preventing means includes an impeding element, positioned intermediate the handle and the latch hook, and constructed and arranged to a portion of the latch hook at a point intermediate the fixed pivot point and the second pivot point.

3. In an overcenter tension latch assembly having a handle, a latch hook, a keeper for the latch hook, and a link mechanism having a fixed pivot point and a second pivot point rotatable about the fixed pivot point, the link mechanism engaging the handle and connecting the latch hook with the fixed pivot point, the second pivot point being overcenter relative to the fixed pivot point to provide a primary locking mechanism when the latch hook is secured relative to the keeper, wherein the improvement comprises:

means, independent of the handle, for preventing rotation of the link mechanism, the hook, and the second pivot point about the fixed pivot point when the latch hook is secured in latching relationship to the keeper, said means including an impeding element positioned intermediate the handle and the latch hook;

said impeding element having a rigid construction including a first portion having an arcuate end edge for bearing against a portion of the latch hook during closure of the latch assembly handle and a second portion rotatably mounted with the handle and the link mechanism;

said means for preventing rotation further being constructed and arranged to contact a portion of the latch hook at a point intermediate the fixed pivot point and the second pivot point, whereby forces applied to the secured latch assembly tending to release the assembly from an overcenter primary locked position are counteracted by said rotation preventing means, thereby providing a supplemental locking mechanism.

4. In an overcenter tension latch assembly having a handle, a latch hook, a keeper for the latch hook, and a link mechanism having a fixed pivot point and a second pivot point rotatable about the fixed pivot point, the link mechanism engaging the handle and connecting the latch hook with the fixed pivot point, the second pivot point being overcenter relative to the fixed pivot point to provide a primary locking mechanism when the latch hook is secured relative to the keeper, wherein the improvement comprises:

means, independent of the handle, for preventing rotation of the link mechanism, the hook, and the second pivot point about the fixed pivot point when the latch hook is secured in latching relationship to the keeper, said means including an impeding element positioned intermediate the handle and the latch hook;

said impeding element having a rigid construction including a first portion having an arcuate end edge for bearing against a position of the latch hook during closure of the latch assembly handle and a second portion rotatably mounted with the handle and the link mechanism at a point distal from said impeding element arcuate end edge,     said means for preventing rotation further being constructed and arranged to contact a portion of the latch hook at a point intermediate the fixed pivot point and the second pivot point, whereby forces applied to the secured latch assembly tending to release the assembly from an overcenter primary locked position are counteracted by said rotation preventing means, thereby providing a supplemental locking mechanism.

* * * * *